United States Patent [19]

Ueda

[11] 4,000,982

[45] Jan. 4, 1977

[54] BEARING MATERIAL

[75] Inventor: Hiroshi Ueda, Nagoya, Japan

[73] Assignee: Taiho Kogyo Co., Ltd., Toyota, Japan

[22] Filed: Apr. 10, 1975

[21] Appl. No.: 566,788

[52] U.S. Cl. .............................. 29/182.3; 29/182.5; 252/12; 252/12.2

[51] Int. Cl.$^2$ ...................... B22F 3/26; B22F 7/04; B22F 5/00

[58] Field of Search ........... 252/12, 12.2; 29/182.3, 29/182.5

[56] References Cited

UNITED STATES PATENTS

| 3,224,966 | 12/1965 | Li | 252/12.2 |
|---|---|---|---|
| 3,305,325 | 2/1967 | Brasse et al. | 29/182.3 |
| 3,421,972 | 1/1969 | Cromwell et al. | 29/182.3 |
| 3,455,864 | 7/1969 | Dobson | 252/12.2 |
| 3,516,933 | 6/1970 | Andrews et al. | 252/12 |
| 3,705,450 | 12/1972 | Morisaki | 29/182.3 |
| 3,764,532 | 10/1973 | Fisher et al. | 252/12 |
| 3,896,036 | 7/1975 | Cairns | 252/12 |

Primary Examiner—Brooks H. Hunt
Attorney, Agent, or Firm—Woodhams, Blanchard and Flynn

[57] ABSTRACT

A bearing material which comprises a back metal; a porous sintered layer formed by using a powder of iron, copper, iron alloy or copper alloy on said back metal; and an impregnated layer formed by impregnating a mixture of polytetrafluoroethylene resin powder, zinc powder and aluminum oxide powder to said porous sintered layer, said bearing material having excellent resistance to load, wear and scraping and being suitable for reciprocating sliding mechanisms receiving large and fluctuating loads.

6 Claims, 3 Drawing Figures

BEARING MATERIAL

BACKGROUND OF THE INVENTION

This invention relates to a bearing material. More particularly, the invention relates to a bearing material which is most suitable for reciprocating motion mechanisms receiving large and fluctuating loads.

Unlike the bearings of common machine tools which bear the rotations in one direction, the bearings used for reciprocating motion mechanisms such as shock absorbers of automobiles are liable to receive unsymmetrical contacts, and they are subjected to uneven wear by reciprocating sliding motions. Therefore, the bearing material for such reciprocating motion mechanisms must have excellent load resistance and wear resistance as compared with those for the conventional machine tools. Further, in the case of the double-layered bearing material employed in the present invention, adherence between the sliding surface material and the back metal is also required.

As the bearing material for reciprocating sliding mechanisms such as the shock aborbers of automobiles, a copper-lead alloy or the like has heretofore been employed. With the recent improvement of high-powered engines and high-speed sliding mechanisms, however, a bearing material which bears up against large loads and high-speed sliding is demanded. Further, when unsymmetrical contact is caused to occur in the sliding portion in oil, the oil film is often broken and boundary lubrication is brought about, thus the frictional resistance increases considerably and smooth sliding cannot be expected. In addition, the wear of the material becomes a problem. By the way, the frictional resistance of course becomes large when bearings are used in a dried condition.

As for the bearing material which is not especially restricted to the use for reciprocating sliding members and contains plastics generally having low dry frictional resistance, as disclosed in U.S. Pat. Nos. 2,995,462 and 3,416,941, it is well known that the bearing material is made by a method in which a porous sintered layer of iron or copper powder on a back metal is coated by polytetrafluoroethylene resin, hereinafter referred to as "PTFE," or by a mixture of PTFE and fillers such as lead, lead oxide, thallium, cadmium, cadmium oxide, indium, molybdenum disulfide, aluminum oxide, iron oxide and zinc oxide. These bearing materials are often used for one directional sliding in the rotation of ordinary machine tools. However, under the severe conditions of reciprocating sliding motion wherein large and fluctuating loads are applied, the wear of the bearing surface often becomes large, or the coated layer is scraped off. Therefore, the above-mentioned bearing material cannot be used for such severe conditions.

BRIEF SUMMARY OF THE INVENTION

In view of the above, the principal object of the present invention is to provide a novel and improved bearing material.

Another object of the present invention is to provide a bearing material which can be used under severe conditions such as reciprocating sliding motion.

Still another object of the present invention is to provide a bearing material which has good load resistance and wear resistance.

Pursuant to the above objects, the inventor has carried out eager and extensive studies, and as the result, he has invented the bearing material of the present invention which comprises a back metal; a porous sintered layer of a powder of iron, copper, iron alloy or copper alloy; and an impregnated layer on said sintered layer, wherein said impregnated layer comprises 45 to 94 % by weight of PTFE, 5 to 50 % by weight of zinc and 1 to 5 % by weight of aluminum oxide. The fitting property of PTFE can be improved by combining zinc into the impregnated layer, in addition, the load resistance is also increased. Thus it can be advantageously used for reciprocating motion such as piston motion causing fluctuating loads.

BRIEF DESCRIPTION OF THE DRAWINGS

These and other objects and features of the invention will be more fully understood by referring to the following detailed description presented solely for purpose of illustration and to the accompanying drawings, in which.

DETAILED DESCRIPTION OF THE INVENTION

Figure 1:
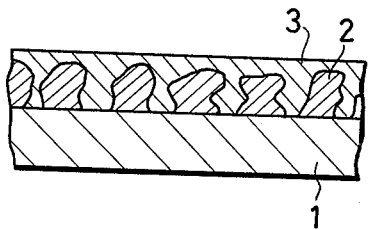
FIG. 1 is a cross-sectional view of the bearing material of the present invention.

The above-mentioned advantage of the impregnated layer of the bearing material results from the crystalline structure and hardness of the used metal. As the crystal lattices of metals, there are for example body-centered cubic lattice 12, face-centered cubic lattice 12, hexagonal lattice 3 etc. (Parenthesized numbers are glide planes). The crystal lattice having many glide planes, that is, the body-centered cubic lattice, is generally liable to cause plastic flow and is easily worn down as compared with the hexagonal lattice. The zinc used as a filler for the impregnated layer of the present invention is hexagonal lattice, while the commonly used lead employed as the filler of bearing material is face-centered cubic lattice. Further, with regard to Mohs' hardness, zinc is 2.5, while the ordinary fillers are lower such as lead is 1.5, cadmium 2.0, molybdenum disulfide 1.5, and thallium 2.0. Therefore zinc is the hardest of these. Further, in view of the coefficient of friction, it is generally accepted that the coefficient is low when the ratio $e/H$ of surface energy $e$ and hardness H is small, and in this regard, zinc belongs to the lower group.

From the above, it will be understood that zinc gives mechanical strength without lowering the fitting property, which is desirable, as compared with other fitting metals. Therefore, zinc can be most advantageously used as the filler for the bearing material used for the reciprocating sliding mechanisms.

The suitable quantity of zinc in said impregnated layer is about 5 to 50 percent by weight. When it becomes less than 5 percent by weight, a sufficient effect of the addition can not be expected. On the contrary, when the addition of zinc is more than 50 percent by weight, the frictional resistance of the layer becomes large and heat is generated causing wear and scraping of the impregnated layer. Therefore, the content of zinc is preferably in the range of 10 to 35 percent by weight. Further, the wear resistance and the life-time of the impregnated layer can be improved by adding aluminum oxide thereto. The addition of 1 percent by weight of aluminum oxide is effective, however, if it exceeds 5 percent by weight, the aluminum oxide scratches the surface of a shaft, and the impregnated layer of the bearing material will be sometimes scraped off.

In the application of the impregnated layer, a paste-like mixture is firstly prepared from PTFE dispersion and the powder of zinc and aluminum oxide, and the porous sintered layer on the back metal is impregnated with the above mixture. When the porous layer is formed, powder of copper alloy such as copper-tin, copper-lead or copper-lead-tin is placed on a back metal, and it is then heated and sintered. Further, powder of iron, and the mixture of powders of iron, copper and tin can also be used.

As compared with the bearing materials in the prior art in which the coating layer comprises copper-lead alloy, PTFE resin or the combination of PTFE and lead, lead oxide, cadmium, thallium, cadmium oxide, indium, aluminum oxide, iron oxide or zinc oxide, the bearing material of the present invention is excellent in load resistance and wear resistance, and the impregnated layer is hard to scrape off.

EXAMPLE

A porous sintered layer of 0.1 to 0.2 mm in thickness was formed on a back metal made of steel by placing −80 mesh powder of lead-bronze alloy (Pb: 10 percent, Sn: 10 percent and Cu: remainder) and heating to 780° C in a reducing atmosphere. A mixture of PTFE dispersion, −200 mesh zinc powder and aluminum oxide ($Al_2O_3$) powder of less than 5 microns in diameter was applied to the above porous sintered layer on the back metal, dried at 100° C, pressed to impregnate the mixture, and baked at 380° to 400° C to obtain a bearing material of the present invention. According to the above steps, Test Pieces 1 to 4 were prepared, the compounding ratios of PTFE (as solid), zinc powder and aluminum oxide powder of said test pieces are shown in the following Table 1. As shown in FIG. 1 with regard to the test pieces, the coating 3 of the mixture of 0.02 to 0.03 mm in thickness (on the free space of the porous layer) was formed within and over the porous sintered layer 2 attached on the back metal 1, and the zinc powder and aluminum oxide powder were uniformly dispersed in the coating layer 3. Further, other Comparative Test Pieces 5 to 7 were prepared in like manner as the above by using the mixture as indicated also in the following Table 1.

Table 1

| Test Pieces | PTFE | $Al_2O_3$ | Zn, ZnO or Pb | |
|---|---|---|---|---|
| 1 | 92 | 3 | Zn | 5 |
| 2 | 84 | 1 | " | 15 |
| 3 | 82 | 3 | " | 15 |
| 4 | 47 | 3 | " | 50 |
| 5 | 60 | — | Pb | 30 |
| 6 | 92 | 3 | " | 5 |
| 7 | 92 | 3 | ZnO | 5 |

Unit: % by weight Components

Test I

Using the test pieces obtained through the above process, reciprocating sliding tests at a constant load were carried out to measure the wear losses.

Figure 2:
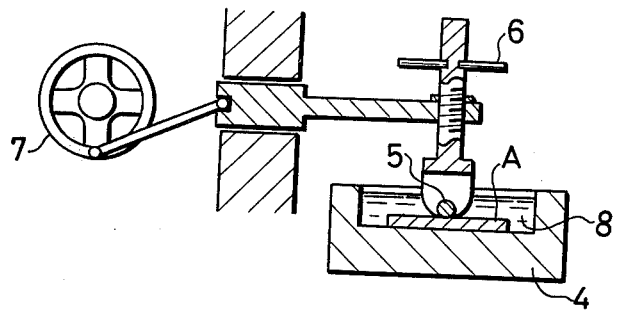
FIG. 2 is a cross-sectional view of a testing machine for testing a plate-like bearing material.

Test Conditions:
1. Testing Machine
   As shown in FIG. 2, a rod 5 of 5 mm in length and 20 mm in diameter was placed on a test plate A which is fitted in a stationary bed 4. A load was put by an adjusting handwheel 6, and the rod 5 was moved reciprocatingly on the test plate A by moving a crank 7. The test plate A was placed in lubricating oil 8.
2. Load
   10, 20 and 30 Kg
3. Speed of Sliding
   Maximum 2.0 m/sec (10.8 Hz)
4. Stroke of Sliding
   30 mm
5. Time of Sliding
   30 minutes
6. Oil
   Shock absorber oil on the market (JWS 2042)
7. Counterpart (Rod 5)
   Material: S45C ($20\mu$ thick hard chromium plating)
   Surface Hardness: 1000 Hv
   Surface Roughness: Mirror surface The results of the above tests are shown in the following Table 2.

Table 2

Alternating Sliding Test at Constant Load (unit: $\mu$)

| Test Piece | Load (Kg) | | |
|---|---|---|---|
| | 10 | 20 | 30 |
| 1 | Not more than 2 $\mu$ | 6 | 11 |
| 2 | " | 5 | 13 |
| 3 | " | 5 | 6 |
| 4 | " | 7 | 15 |
| 5 | " | 25 | 40 |
| 6 | " | 7 | 34 |
| 7 | " | 8 | 45 |

From the above Table 2, it will be understood that the bearing materials of the present invention (Test Pieces 1 to 4) are about equal to the ordinary bearing materials (Test Pieces 6 and 7, except 5) in view of the wear depths at 10 Kg and 20 Kg loads, however, the bearing materials of the present invention are excellent at 30 Kg load. When the wear depth becomes more than 20 microns, the impregnated layer is substantially scraped off and it is not suitable for use.

Test II

Cylindrical bushes were formed using test pieces obtained in the foregoing process, and fluctuating load tests in conformity with the practical uses were carried out.

Figure 3:
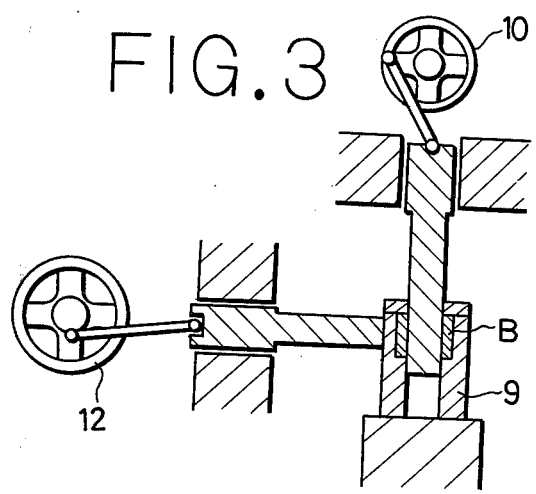
FIG. 3 is a cross-sectional view of another testing machine for testing a bush-like bearing material.

Test Conditions:
1. Test Machine
   As shown in FIG. 3, the test piece in the form of a bush B was fitted in an outer shell 9, and a crank 10 was moved to cause the vertical motion of a length of the diameter, while a crank 12 was driven at the same time to cause the fluctuating transverse load.
2. Load (Fluctuating transverse load)
   ± 100 Kg
3. Speed of Sliding
   Maximum 2.0 m/sec
4. Stroke of Sliding
   60 mm
5. Oil
   Shock absorber oil on the market (JWS 2042)
6. Counterpart
   Material: S45C (20 $\mu$ thick hard chromium plating)
   Surface Hardness: 1000 Hv
   Surface Roughness: Mirror Surface
   Diameter: 20 $\phi$ The results of the above tests are shown in the following Table 3.

Table 3

| Test Piece | Number of Repetitions ($10^4$ times) | Result |
| --- | --- | --- |
| 1 | 400 | Impregnated layer was scraped off |
| 2 | 350 | " |
| 3 | 800 | Not scraped off |
| 4 | 350 | Impregnated layer was scraped off |
| 5 | 200 | " |
| 6 | 300 | " |
| 7 | 300 | " |

As shown in the above Table 3, the bearing material of the present invention is hard to scrape off as compared with the ordinary bearing materials (Test Pieces 5, 6 and 7). In addition, it will be understood that the Test Piece 3 is especially excellent.

In accordance with the foregoing disclosures, the bearing material of the present invention can be produced by forming the porous sintered layer of the powder iron, copper, iron alloy or copper alloy on the back metal, and impregnating the mixture of PTFE, zinc and aluminum oxide to the porous sintered layer. And the thus produced bearing material has excellent load resistance, wear resistance and scraping resistance in the reciprocating sliding motion receiving fluctuating transverse load. The bearing material of the present invention can be advantageously used for the shock absorbers of automobiles, the bearings of lifting devices of fork lifts, and the like which receive reciprocating sliding motions.

It should be emphasized, however, that the specific examples described herein are intended as merely illustrative and in no way restrictive of the invention.

What is claimed is:

1. In a bearing material comprising a metal back, a porous sintered metal matrix layer bonded to a surface of said metal back, said metal layer consisting essentially of particles of a metal selected from the group consisting of iron, iron alloys, copper and copper alloys; and a composition impregnated into and substantially filling the voids in said metal layer and forming a surface layer thereon, the improvement which comprises: said composition consists essentially of a uniform blend of 45 to 94 percent by weight of polytetrafluoroethylene, 5 to 50 percent by weight of zinc metal powder and 1 to 5 percent by weight of aluminum oxide powder.

2. A bearing material as claimed in claim 1, in which said porous sintered metal layer is made of a material selected from the group consisting of copper-tin alloy powder, copper-lead alloy powder and copper-lead-tin alloy powder.

3. A bearing material as claimed in claim 1, in which said porous sintered metal layer is made of a mixture of iron powder, copper powder and tin powder.

4. A bearing material as claimed in claim 1, in which said composition is applied to said porous sintered metal layer by impregnation, and then is baked at a temperature of 380° to 400° C.

5. A bearing material as claimed in claim 1 in which said composition contains from 10 to 35 percent by weight of zinc metal powder.

6. A bearing material as claimed in claim 1 in which said composition consists essentially of about 82 percent by weight of polytetrafluoroethylene, about 3 percent by weight of aluminum oxide powder and about 15 percent by weight of zinc metal powder.

* * * * *